US006212306B1

(12) United States Patent
Cooper et al.

(10) Patent No.: US 6,212,306 B1
(45) Date of Patent: Apr. 3, 2001

(54) METHOD AND DEVICE FOR TIME DOMAIN DEMULTIPLEXING OF SERIAL FIBER BRAGG GRATING SENSOR ARRAYS

(75) Inventors: David J. F. Cooper, 201-127 St. Patrick St., Toronto, Ontario (CA), M5T 3C1; Peter W. E. Smith, 77 Avenue Rd. Suite 306, Toronto, Ontario (CA), M5R 3R8

(73) Assignees: David J. F. Cooper; Peter W. E. Smith, both of Toronto (CA)

( * ) Notice: Subject to any disclaimer, the term of this patent is extended or adjusted under 35 U.S.C. 154(b) by 0 days.

(21) Appl. No.: 09/413,800

(22) Filed: Oct. 7, 1999

(51) Int. Cl.[7] .............................. G02B 6/00; G01B 11/16
(52) U.S. Cl. ....................... 385/12; 359/349; 250/227.19
(58) Field of Search .................................. 385/12, 13, 37; 356/345, 349, 35.5; 250/227.18, 227.19, 227.23

(56) References Cited

U.S. PATENT DOCUMENTS

| 4,996,419 | * | 2/1991 | Morey | 250/227.18 |
| 5,680,489 | | 10/1997 | Kersey | 385/12 |
| 5,684,297 | * | 11/1997 | Tardy | 250/227.14 |
| 5,757,487 | * | 5/1998 | Kersey | 356/345 |
| 5,987,197 | * | 11/1999 | Kersey | 385/24 |
| 6,072,567 | * | 6/2000 | Sapack | 356/32 |

OTHER PUBLICATIONS

Fiber Grating Sensors, Journal of Lightwave Technology, vol. 15., No. 8 Aug. 1997, pp. 1442–1462.
Fiber Optic Bragg Grating Sensors, SPIE, vol. 1169, Fiber Optic and Laser Sensors VII (1989), pp. 98–107.
Narrow–Band Bragg Reflectors In Optical Fibers, Optics Letters, vol. 3 No. 2, Aug. 1978, pp. 66–68.

* cited by examiner

Primary Examiner—Hemang Sanghavi
(74) Attorney, Agent, or Firm—Hill & Schumacher

(57) ABSTRACT

The present invention provides a method and device for to implement time division multiplexing of a fiber optic serial Bragg grating sensor array containing more than one Bragg grating. The device provides a pulse read-out system that allows for a reduction in system noise and an increase in sensor resolution and flexibility. The optical signals reflected from the Bragg grating sensors are gated by an electronically controlled optical modulator before any wavelength measurement is performed to determine the sensor information. This offers significant advantages since the sensor information is encoded into the wavelength of the optical signal and not its intensity. Therefore the sensor signal information is not distorted by the gating. Since the gating or switching of the optical modulator between transmission and attenuating states is performed on the optical signal, the speed of the electronic processing needs only to be performed at the speed of variation of the sensor information and the choice of methods of wavelength measurement is not influenced by the gating action.

29 Claims, 6 Drawing Sheets

METHOD AND DEVICE FOR TIME DOMAIN DEMULTIPLEXING OF SERIAL FIBER BRAGG GRATING SENSOR ARRAYS

FIELD OF THE INVENTION

The present invention relates to a method and apparatus for optical demultiplexing multiple Bragg grating sensors in a serial array in optical fibers.

BACKGROUND OF THE INVENTION

Fiber optic Bragg gratings may be used as sensors to monitor perturbations in their environment. A Bragg grating is formed in a single mode optical fiber by creating a periodic refractive index perturbation in the fiber core as described by Kawaski, Hill, Johnson and Fuhjii in Optics Letters, Vol. 3, pp. 66–68, 1978. The diffraction grating in the fiber core will reflect optical frequencies within a narrow bandwidth around the Bragg wavelength of the optical grating. The Bragg wavelength of the diffraction grating can be altered by changing the grating pitch. If an external influence alters the grating pitch then the reflection spectrum of the grating can be monitored to determine the magnitude of the external influence. If the grating is subject to varying strain or temperature, the pitch of the grating is altered as described by Morey, Meltz and Glenn in the Proceeding of the IEEE, vol. 1169, pp. 98–107, 1989. By coupling the grating to an appropriate transducer, the grating can be used to monitor a wide variety of parameters including but not limited to strain, temperature, vibration, pressure, and acceleration.

Fiber optic Bragg grating sensors offer many advantages over traditional electrical sensors for monitoring the various parameters. They provide inherent immunity to electromagnetic interference and provide a reliable signal with very little noise. They can also withstand large variations in temperature and pressure and are compact in size allowing them to be used in locations where conventional sensors are impractical. Bragg grating fiber sensors have the additional advantage that the signal is encoded directly into an absolute wavelength shift of the optical signal, so the signal is insensitive to optical power fluctuations and other signal perturbations.

Unfortunately, the design of Bragg grating sensor systems is often more costly than the conventional electrical sensor alternatives and this has prevented their widespread adoption in many applications. To increase the utility of Bragg grating sensors, it would be advantageous to be able to multiplex many grating sensors in the same optical fiber in order share expensive resources such as the optical source and the sensor measurement unit among the many sensors thereby dramatically reducing the cost per sensor. The placement of many sensors in the same fiber often simplifies the installation of the sensors in structures or systems by reducing bulk and complexity. It is also desirable that the functionality and performance of the system not be degraded by the multiplexing technique.

These potential advantages have motivated significant efforts into developing methods of multiplexing Bragg grating sensors. It would be very beneficial to be able to multiplex a hundred sensors or more in a single optical fiber using only one light source and spectral measurement system. Current systems have fallen short of this goal with about ten sensors per fiber in demonstrated systems that do not severely restrict the sensor's application. As the number of sensors grows there is an increased demand on the optical source power and the complexity of the multiplexing and/or demultiplexing. For a very large number of sensors the cross talk between the sensors can become a significant problem.

Many different multiplexing techniques have been developed for Bragg grating sensors. The most successful techniques for use with a large number of sensors have been wavelength division and time division multiplexing. Examples of these systems are described in the paper by Kersey et al. in the Journal of Lightwave Technology vol. 15, pp.1442–1462, 1997.

In wavelength division multiplexing, the Bragg wavelength of each sensor is set at a separate and unique wavelength. The separations of the Bragg wavelengths are made to be far enough apart so that any reasonable external influence to the grating sensors will not be sufficient to cause the Bragg wavelengths of any two sensors to overlap. Thus each sensor is given a unique wavelength band or slot for its Bragg wavelength. In many situations, the size of each wavelength slot may need to be very large. This requirement can result from the necessity to be able to detect a large range of the parameter being sensed or due to the fact there may be uncertainty in the nominal Bragg wavelength of the sensors. Uncertainty may arise from variations in the fabrication process of the gratings, by static strains or uncertain operating temperatures when the sensor is used. The variability can necessitate a wavelength slot for each sensor in excess of 15 nm for Bragg wavelengths near 1550 nm. When the number of multiplexed sensors is large, the bandwidth requirement on the optical source can become intractable thus limiting wavelength division multiplexing to well controlled sensors that are subject to small external influences.

To overcome the aforementioned problems associated with limited optical bandwidth, the Bragg wavelengths of the sensors may be fabricated with nearly identical Bragg wavelengths and multiplexed with time division multiplexing. In this method a short optical pulse is sent along the fiber containing the Bragg sensors. The pulse will partially reflect off of each sensor and return the sensor information from each grating. The signals from each sensor can be distinguished by their time of arrival. Previous demonstrations of time division multiplexing have determined the time of arrival of the signal by converting the optical pulses into an electrical signal and then gating the electrical signal with a known time delay. Only the pulse that is passing through the electronic detector at the time of the gate is measured. By varying the time delay of the gate, the signals from each of the sensors can be read out.

A previous method used in the art to identify the sensor signals is to electrically gate the sensor signals as disclosed in U.S. Pat. No. 5,680,489. Since the sensors are now identified by time discrimination instead of wavelength, bandwidth requirements of the source will not limit the number of sensors. However, different problems can be encountered in time division multiplexing that can limit the performance of the system. Time division multiplexed systems generally experience more noise than wavelength division multiplexed systems. A significant contribution of the noise is from multiple reflection between the different grating sensors that cause a pulse to arrive back from the sensor array at a time later than expected. Noise is also be contributed by the optical source which may not be pulsed in an ideal manner so that there is a finite level of optical power between successive pulses.

Bragg grating sensor systems often require a very high dynamic range of eighty to a hundred and twenty decibels. Therefore any small sources of noise can be significant. To optimize the performance of the system it is necessary to perform the signal gating in as short a time period as possible. This allows the system to reject a large portion of the noise that does not return at the same time as a sensor pulse. With the method of gating used previously in the art, the performance of the system is limited. An electronic circuit performs the gating action after an optical detector has detected the optical signal. Therefore the electronic circuit must be operated at the speed of arrival of the optical pulses. It is difficult to operate electronic circuits at very high speed and still maintain very high signal fidelity due to noise and distortion. Since the gating is done after the optical signal is detected, the wavelength measurement on the signals must be done before the gating. Therefore any noise or distortions in the gating process will create errors in the sensor signal. Furthermore, the limited operation of this gating method will reduce the spatial resolution of the sensor system since the pulses from the sensor array must be spaced far apart in time.

It would therefore be very advantageous to provide a method and apparatus for time division optical multiplexing multiple serial Bragg gratings in optical fibers which reduces noise associated with the gating process and allows for very fast gating times.

SUMMARY OF INVENTION

It is an object of the present invention to provide a method and apparatus to facilitate multiplexing many Bragg grating sensors along an optical fiber that can all share the same optical source and sensor processing unit.

The present invention provides a pulse read-out system to implement time division multiplexing of a fiber optic Bragg grating sensor array. The pulse read-out system allows for a reduction in system noise and an increase in sensor resolution and flexibility. The essential idea of the invention is that the optical signal from the grating sensors is gated by an electronically controlled optical modulator before any wavelength measurement is performed to determine the sensor information. This offers significant advantages since the sensor information is encoded into the wavelength of the optical signal and not its intensity. Therefore the sensor signal information is not distorted by the gating. Since the gating is performed on the optical signal, the speed of the electronic processing needs only to be performed at the speed of variation of the sensor information and the choice of methods of wavelength measurement is not influenced by the gating action.

The gating or switching action of the optical modulator will modify the optical power transmitted to the sensor information-processing portion of the system, but will not modify the spectral content of the optical signal. Therefore distortion and noise in the gating signal will not alter the sensor reading thus providing a more robust read-out system. This allows the system to operate at very short gating times and provides a measure of immunity from unwanted signals returning from the sensor array and provides superior sensor spatial resolution.

The present invention provides a means for evaluating the sensor configuration of the network to high degree of precision if it is not known beforehand. A means is also provided to implement synchronous detection of the sensor signal in combination with the gating action of the optical signal.

An additional advantage of the present method is its flexibility with sensor signal decoding techniques. Depending on the application of the sensors, different demands may be required of the system. For example, one may want to measure rapidly varying signals or quasi-static signals. One may require a large dynamic range or a large sensing range. Many different techniques of decoding the sensor information of Bragg gratings have been developed but all of them must measure the wavelength of the returned signal. Therefore the present sensor read-out technique can be easily integrated with a wide variety of sensor measurement methods since the optical gating does not alter the wavelength information of the optical signal. This is in contrast to previous techniques where the electronic gating is performed after the wavelength detection making it more difficult to integrate the demultiplexing with the sensor decoding technique.

The present invention provides an optical fiber serial Bragg grating sensor device, comprising:

a) a light source adapted to produce optical pulses;

b) an optical fiber network including an optical fiber optically coupled to said light source, the optical fiber including a Bragg sensor array having at least two spaced apart Bragg gratings; and c) an optical transmission element connected to a section of said optical fiber network adapted to receive optical pulses reflected from said at least two Bragg gratings, a wavelength detection means optically coupled to said optical transmission element, switch means connected to said optical transmission element for switching said optical transmission element between an attenuating state in which said optical transmission element attenuates light and a transmission state in which light is transmitted through said optical transmission element to said wavelength detection means, said switch means being activated at selectively adjustable times after production of said optical pulses.

The present invention also provides a device for time domain demultiplexing serial optical fiber Bragg grating sensor networks, the network including a light source adapted to produce optical pulses connected to an optical fiber network with the optical fiber network including a sensor array having at plurality of spaced Bragg gratings. The device comprises an optical transmission element connected to a section of said optical fiber network adapted to receive optical pulses reflected from said at least two Bragg gratings, switch means connected to said optical transmission element for switching said optical transmission element between a transmission state in which said optical transmission element transmits light therethrough and an attenuating state in which said optical transmission element attenuates light, said switch means being activated at selectively adjustable times after production of said optical pulses; and wavelength detection means connected to said optical transmission element.

The present invention also provides a method for time domain demultiplexing a serial fiber Bragg grating sensor network, the sensor network including an optical fiber having at least two spaced Bragg gratings and a light source for producing light pulses that propagate along the sensor network and are incident on said at least two Bragg gratings. The method comprises:

directing optical pulses reflected by said at least two Bragg gratings to an optical transmission element;

spectrally analyzing optical pulses reflected from a selected Bragg grating by switching said optical transmission element to a state of transmission at effective periods of time after preselected optical pulses are produced, said periods of time being equal to a transit time of said optical pulses from a light source to said selected Bragg grating and to said optical transmission element; and maintaining said optical transmission element in the state of transmission for an effective period of time to permit light pulses to be transmitted through said optical transmission element to a wavelength detection means and thereafter switching said optical transmission element to a state of attenuation to block optical pulses reflected from all other Bragg gratings.

BRIEF DESCRIPTION OF THE DRAWINGS

The method and apparatus for time division optical demultiplexing Bragg gratings in optical fibers will now be described, by way of example only, reference being had to the accompanying drawings, in which.

DETAILED DESCRIPTION OF THE INVENTION

Figure 1:
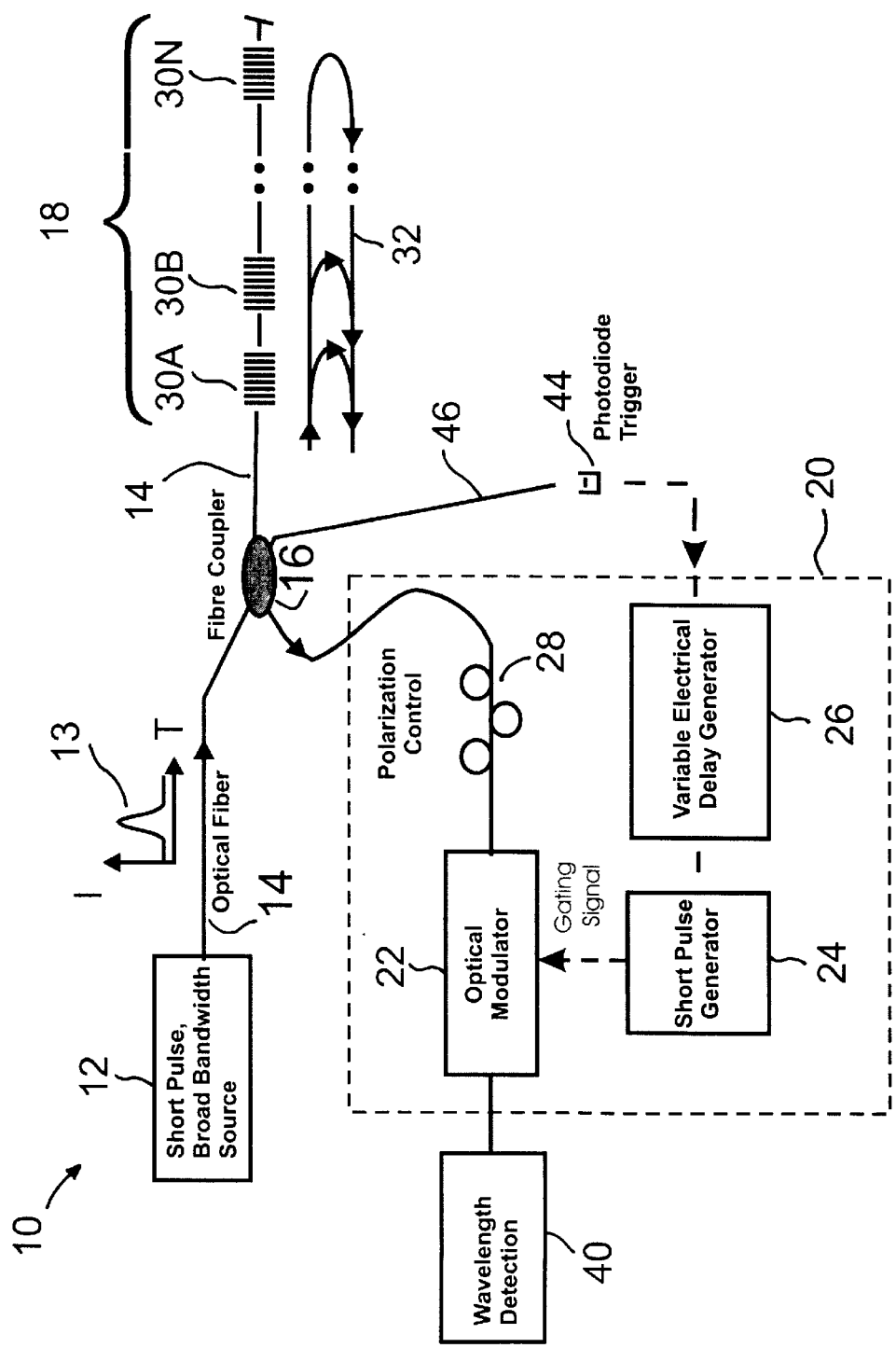
FIG. 1 is a block diagram of a system for time division optical demultiplexing of multiple Bragg gratings in an optical fiber.

Referring first to FIG. 1, an apparatus used for time division optical demultiplexing multiple Bragg gratings in optical fibers is shown generally at 10. A light source 12 launches optical pulses 13 into a optical fiber 14 containing a fiber splitter 16 and a serial array of Bragg grating sensors 18 located on the other side of splitter 16 from source 12. The optical fiber used is preferably a single mode silica optical fiber however any other optical fiber or waveguide in which a Bragg grating can be written may be used. Each sensor in sensor array 18 will return an optical pulse with wavelength encoded information, producing a train of pulses that are directed towards an optical demultiplexing system 20. The sensors in array 18 are coupled to one or more external parameters that they are to monitor so that changes in these parameters will modify the Bragg wavelength of the sensors. The coupling may be achieved by embedding or bonding the fiber sensors 18 to the structure or apparatus to be monitored so that changes in temperature or strain are also experienced by the sensors. The sensors may also be coupled to an appropriate transducer known in the art to convert other parameters into a shift in the sensor's Bragg wavelength. The optical fiber near the sensors has the protective buffer removed to permit the sensors to be directly coupled to the appropriate structure, apparatus or transducer.

The optical demultiplexing system 20 is essentially an optical transmission device that can be rapidly switched between a transmission state in which light is transmitted through it and an attenuation state in which light is attenuated. The optical transmission device includes an optical modulator 22, a preferred optical modulator is a commercial lithium niobate opto-electronic modulator that is gated (switched) using a switching mechanism comprising an electrical signal from a short pulse generator 24 so that light is only allowed to pass through the modulator 22 to a wavelength detection system 40 when the gating voltage signal is applied. The switch also includes a variable electrical delay generator 24 connected to the short pulse generator 24. By varying the time delay of the gating signal using the variable electrical delay generator 24, the individual reflected optical pulses transmitted through the modulator to the wavelength detection system are selected. The optical demultiplexing system 20 may include a polarization control 28. The polarization control is useful for adjusting the polarization of the sensor signals to a preferred polarization state if the optical modulator 22 is sensitive to the polarization of the optical signal. The polarization control may be performed by inducing birefringence into the optical fiber after the fiber splitter 16 or by other methods known in the art.

Figure 2:
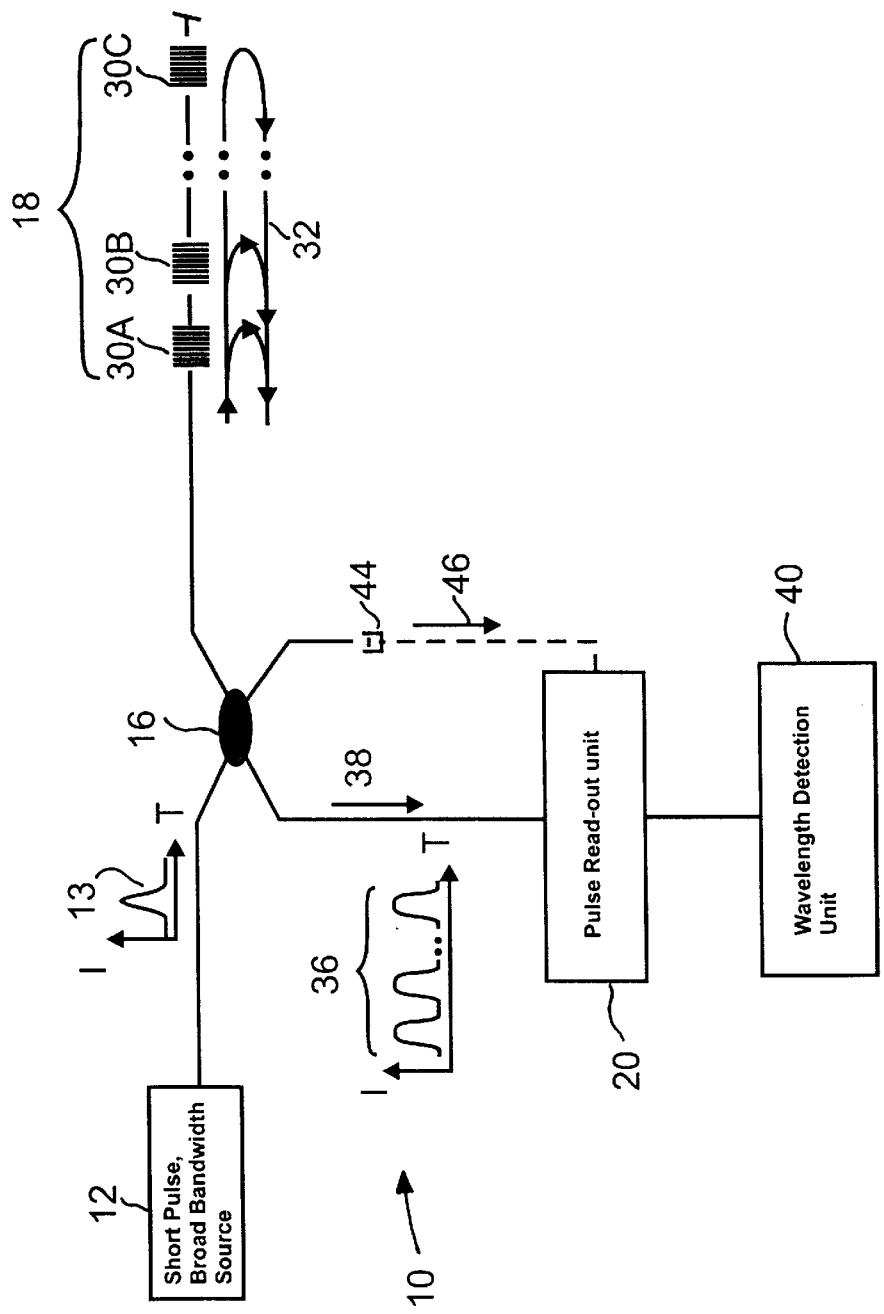
FIG. 2 is a block diagram of a pulsed read-out system forming part of a time-division multiplexed fiber optic Bragg grating sensor array.

Referring to FIG. 2, Bragg grating sensor array 18 includes several Bragg gratings 30A, 30B . . . 30N are written at separate locations in the single mode optical fiber 14. Optical pulse 13 from light source 12 (containing sufficient optical bandwidth to cover the expected range of Bragg wavelengths of any given Bragg grating sensor in array 18) is launched into the serial sensor array 18 through the optical coupler 16. The Bragg grating sensors 30 are each fabricated to be reflective within the bandwidth of the optical source and wavelength measurement capability of the system for any reasonable perturbations of the sensors.

The reflectivity of each Bragg grating sensor in array 18 at each of their respective Bragg wavelengths is designed to be a few percent or less so that only a small portion of the pulse 13 launched into the array is back-reflected at each sensor. The rest of the optical pulse is allowed to propagate to sensors further down the array 18 and be likewise reflected. The arrows 32 indicate the possible paths of the optical signal. Thus, from the single optical pulse 13 launched into the sensor array 18, a train of pulses 36 are returned from the sensor array through the fiber path 38 after passing through coupler 16. Each returned pulse has a spectral content corresponding to the spectral reflectivity of the Bragg grating sensor that it originated from. In general the duration of the pulses must be shorter than the duration of the optical gate and the repetition rate must be lower than the time for the pulse to traverse the fiber and return to the pulse read-out system.

The minimum physical spacing of the Bragg sensors in the array 18 is given by the temporal duration of the optical gate. The time for the optical pulse to travel twice the distance between the two nearest sensors must be longer than the gating time. The maximum number of sensors is limited to the ratio of the total physical length of the sensor array, from the first sensor to the last, to the minimum physical spacing between sensors. The maximum number can also be expressed as the ratio of twice the time for an optical pulse to travel from the first sensor to last, to the temporal duration of the optical gate.

In a preferred embodiment the pulses from the source are made to be shorter in duration than the time for a pulse to travel twice the distance between the two spatially closest sensors on the sensor array. In this preferred embodiment a mode-locked fiber laser producing sub-picosecond pulses with a bandwidth >10 nm may be used. However those skilled in the art will understand that other light sources may be used as long as they meet the requirements described above. Each of the individual pulses making up pulse train 36 from the sensor array 18 will return from the sensor array at unique times. The pulses containing the sensor information in the optical fiber branch 38 are directed towards the pulse read-out system 20. The optical source 10 launches a series of pulses at a fixed repetition rate into the sensor array to repeat the process described above. The period between pulses is greater than the time for a pulse to travel twice the distance from the first sensor to the last sensor in the array.

The sensor information contained within each pulse of pulse train 36 may be identified as coming from the appropriate Bragg grating sensor by the time of arrival of the pulse at the pulse read-out unit 20. The pulse read-out unit 20 allows the optical signal to propagate to the wavelength detection unit 40 for a short period of time and acts as an optical gate on the returned optical signal. The duration of the optical gate is chosen to be longer than the temporal duration of the pulse response from any one Bragg grating and shorter than the time between two pulses arriving from spatially adjacent Bragg grating sensors of array 18.

The timing of the optical modulator is determined by a timing signal derived from the pulses from the optical source 12. The timing signal may be generated by the optical detector 44 and passed to the pulse read out unit 20 through path 46. The signal may also be generated directly at the optical source 12. For example, if the optical source 12 is pulsed directly using an electrical control signal, then this signal may be used for timing by the pulse read-out unit 20.

The timing signal is delayed in the pulse read-out unit 20 and used to trigger the optical gate. The delay is chosen so that only one pulse is allowed to pass through the optical gate for each pulse of pulse train 36 returning from the sensor array 18. Thus, only the signal from one Bragg grating sensor will reach the wavelength detection unit 40, and the wavelength detection can be performed as if only one Bragg grating sensor was being monitored. The wavelength detection unit 40 may be of any standard design that is suitable for measuring the sensor signal and interrogation of the optical pulse may be performed using techniques known in the art.

Figure 3:
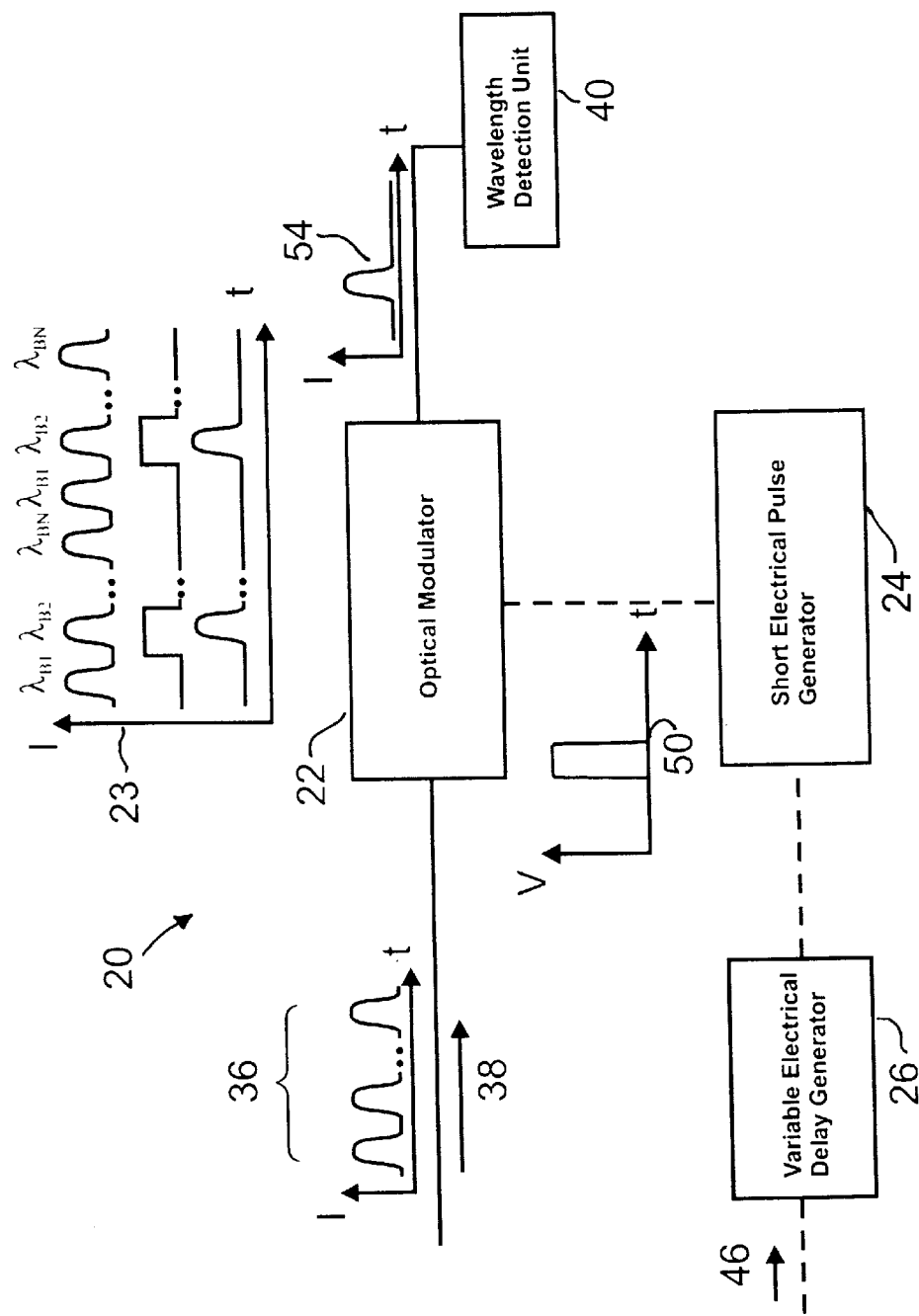
FIG. 3 is a more detailed block diagram of the pulsed read-out unit of FIG. 2.

The operation of the pulse read-out unit 20 is more closely detailed in FIG. 3. The pulse read-out unit 20 includes electronic delay generator 26 connected to short electrical pulse generator 24 which is connected to electro-optical modulator 22 that modifies the transmission of light in accordance with the electrical signal applied to it.

The train of pulses 36 along path 38 of the fiber is shown at the input to the optical modulator 22 in FIG. 3. Each individual pulse has a central wavelength, denoted by $\lambda_{B1}$, $\lambda_{B2} \ldots \lambda_{Bn}$ corresponding to the Bragg grating wavelength of the sensor from which the pulse originates. By choosing a suitable delay of the trigger pulse with the electrical delay generator 26, the short pulse generator can be triggered to produce an electrical pulse to the electro-optical modulator 22 when one of the pulses, for example the pulse containing $\lambda_{B2}$, is passing through the modulator. The gating of the optical pulses is demonstrated graphically by 23. The top set of pulses in 23 shows the progression in time of the set of pulses 36. The gating action of the modulator is shown below these pulses. The gating is synchronized with the pulses containing $\lambda_{B2}$. Below the gating pulses, the selected optical pulses are shown containing only $\lambda_{B2}$. The short pulse generator 24 produces a very short electrical pulse that is wider than the temporal width of the pulse to be gated. It is found that if the pulse from the optical source 12 is several picoseconds or less in temporal duration, then the reflected pulses typically have a temporal width of fifty to a hundred picoseconds. The temporal gate width of the optical modulator 22 should be slightly larger than the width of the pulse, however the lower limit may be restricted by the dynamic response of the modulator or the speed of the electrical pulse generator 24 that produces the gating signal 50. Typical gating times may be from five hundred to a thousand picoseconds. The optical modulator 22 can be implemented, among other methods known in the art, by a Mach-Zehnder integrated optic modulator that is controlled through the electro-optic effect or by a semiconductor electro-absorption modulator.

The process described above is repeated at the repetition rate of the optical source 12 so that only the pulse from one Bragg grating sensor is allowed to pass through the modulator 22 for each pulse launched into the system. This is shown in FIG. 3 by the single pulse 54 that exits from the modulator 22 for the train of pulses incident on the modulator 22. A train of pulses will then arrive at the wavelength detection unit 40 at the repetition rate of the optical source 12. This repetition rate is made to be greater than the electrical bandwidth of the wavelength detection unit 40. The lower bandwidth of the detection electronics will make the train of pulses appear as a continuous signal that varies at the rate of perturbations to the Bragg grating sensors. The average level of detected signal is given by the average optical power from the pulse read-out unit. In this way, the wavelength detection unit effectively is decoding a sensor signal as if there was only one sensor in the system. Thus, any one of the numerous methods known in the art for signal decoding a single Bragg grating sensor may be used.

Different sensors may be monitored by altering the pulse 54 that is selected by the pulse read-out unit from the train of pulses 36 corresponding to each Bragg grating sensor in array 18. This selection is achieved by altering the delay in the electrical delay generator 26 so the gating pulse 50 is applied to the optical modulator 22 when the desired pulse passes through the modulator.

The gating pulse 50 is made to be slightly longer than the optical pulses returning from the sensors. The time between pulses from the optical source will typically be much longer then the gating time. For example if the length of the sensor array 18 is made to be a hundred meters and the gating time was 1 nanosecond, then the optical gate would be open 0.1% of the time. This enables the sensor system to reject a large portion of unwanted signals from sensor array 18. Such unwanted signals include multiple reflections between grating sensors, reflections from fiber splices and other components and noise from the optical source that may be caused by a small continuous light output in addition to the pulsed output. In this way, the pulse read-out system 20 helps to reject erroneous signals from the sensor array 18.

It is to be noted that electrical noise in the gating pulse 50 does not affect the sensor reading. Variations in the gating pulse amplitude will cause variations in the optical signal at the output of the pulse read-out unit 20, but will not affect the spectral content of the optical signal. Therefore the sensor information can still be recovered despite imperfections in the high speed gating pulse.

Figures 4A, 4B, 4C:
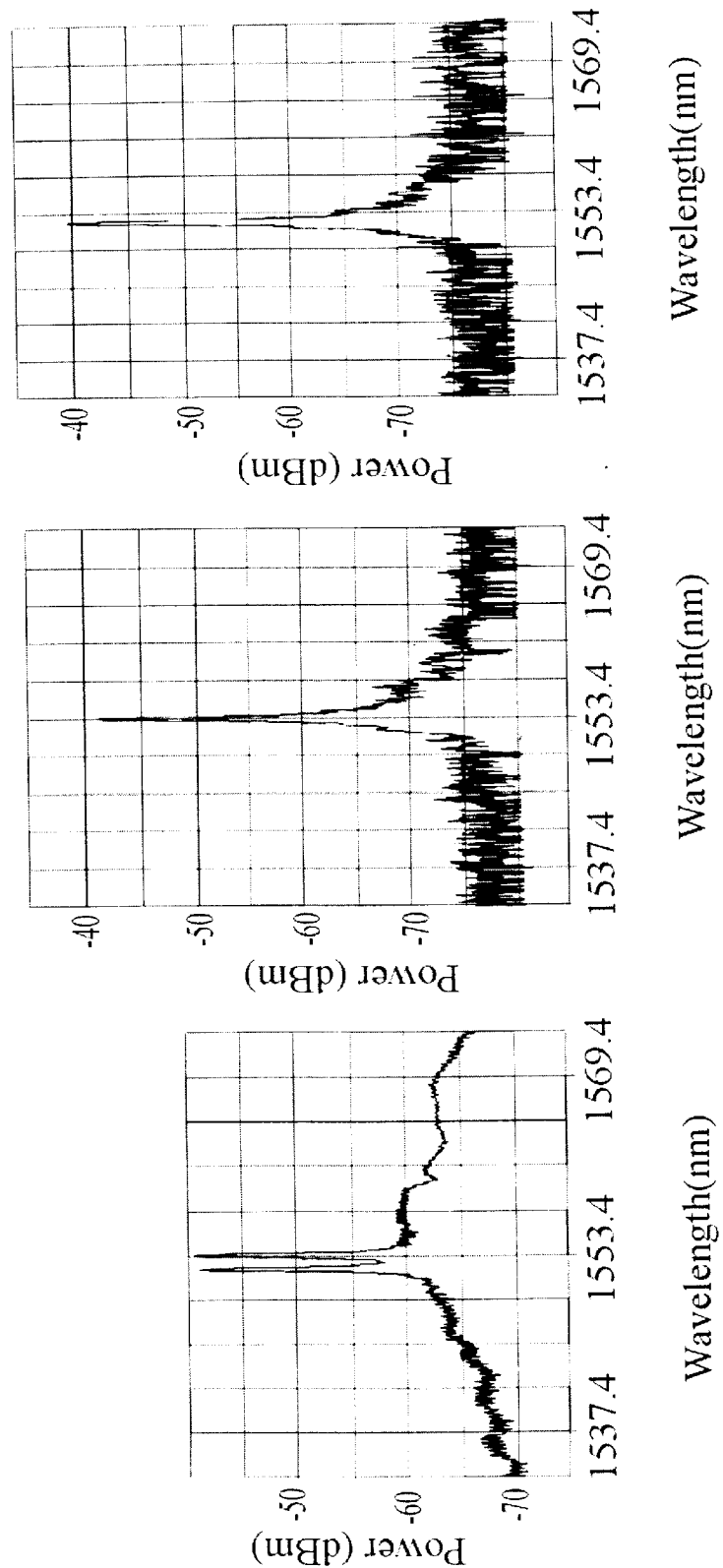
FIG. 4A shows the optical spectrum of a sensor array having two multiplexed Bragg gratings without use of time division demultiplexing.
FIG. 4B shows the optical spectrum of the sensor array of FIG. 4A using a pulsed read-out system using a delay of a gating pulse so that only the optical spectrum from the first Bragg grating sensor in the sensor array is detected.
FIG. 4C is similar to FIG. 4B but using a differently delayed gating pulse so that only the optical spectrum from the second Bragg grating sensor in the sensor array is detected.

FIG. 4 shows the result of the operation of the pulsed read-out unit with a time multiplexed sensor array using two Bragg grating sensors. These figures show the optical spectrum from the sensor array as obtained on a standard optical spectrum analyzer. The optical spectrum from the sensor array without the pulse read-out system is shown in FIG. 4A. In FIG. 4A there are clearly two peaks corresponding to the reflection from the two sensors and some background optical signal. With the use of the pulse read-out system only the optical spectrum from the first Bragg grating sensor in the sensor array is seen at the spectrum analyzer as shown in FIG. 4B. In FIG. 4C the delay of the gating pulse is set so that the spectrum analyzer only measures the spectrum from the second Bragg grating sensor. The pulse read-out unit allows one to identify and isolate the sensor information from each of the Bragg grating sensors.

Figure 5:
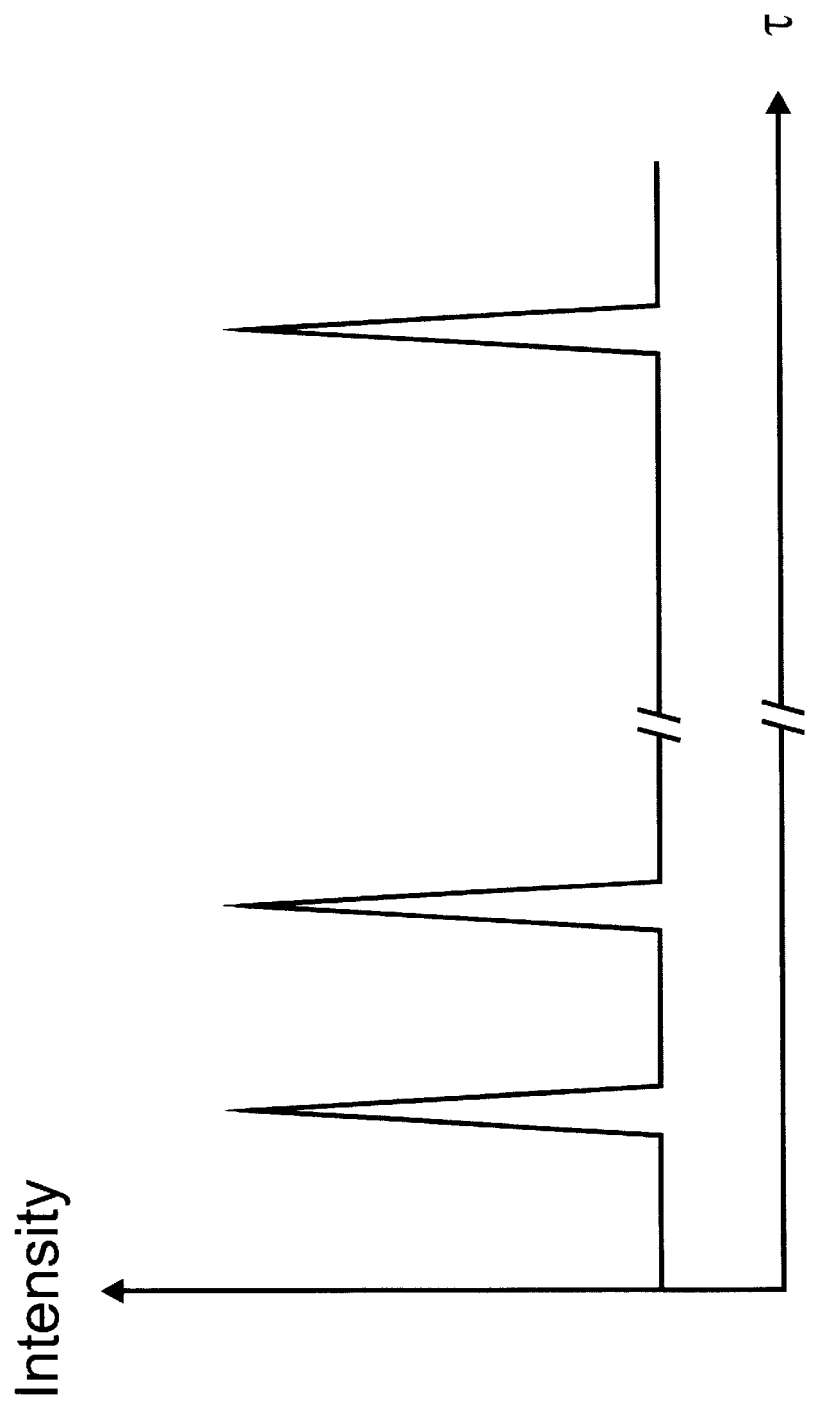
FIG. 5 illustrates a method of determining the configuration of the sensors.

FIG. 5 illustrates a method of using the pulse read-out unit to identify each of the sensor gratings to determine their location in the sensor array and to choose the correct delay to read-out each sensor. An arbitrary starting delay is chosen for the delay generator 26 of FIG. 3. The value of the delay, denoted by the τ axis of FIG. 5 is swept from the starting point given by τ equal to zero to the time for one repetition of the optical source. The optical power at the output of the optical modulator 22 in FIG. 3 versus the delay τ reveals the pulse response of the sensor array. By calibrating the distance along the sensing fiber that the optical signal will travel for a given delay τ, the physical location of each sensor may be determined. Therefore the gratings may be placed in the sensor without detailed knowledge of their positions. By determining the positions of each sensor, and by calculating their Bragg wavelengths, the effects of cross talk due to multiple reflections may also be reduced since the occurrences of multiple reflections can be predicted if the configuration and state of the sensor array is known.

Figure 6:
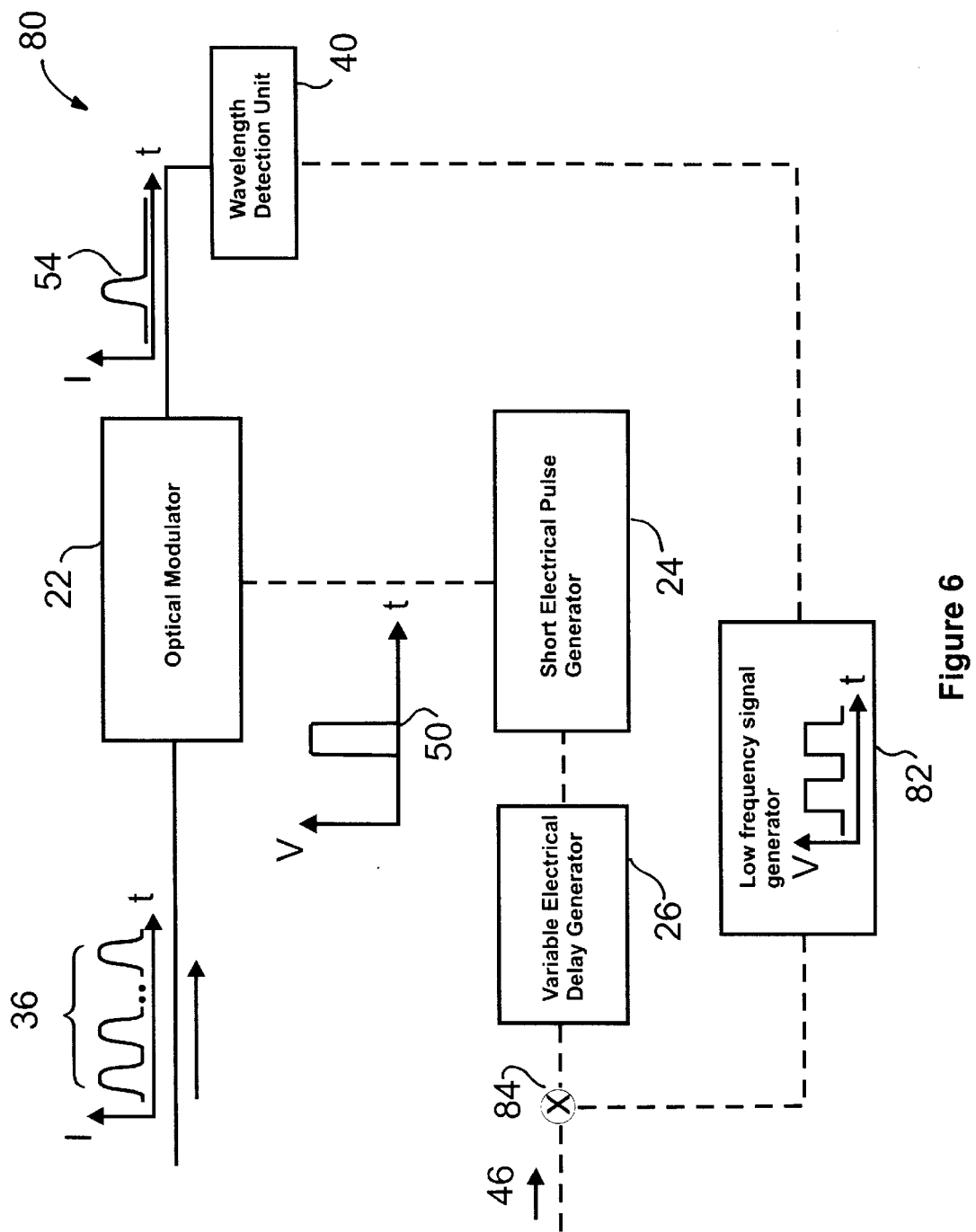
FIG. 6 is a second embodiment of the invention to implement synchronous detection.

An alternative embodiment of the invention is shown at 80 in FIG. 6. The operation of the pulse read-out system 80 in FIG. 6 is similar to the system 20 of FIG. 3 except a low frequency modulating signal 82 is multiplied with the timing signal to the modulator at junction 84. This junction 84 may be placed before the delay generator 26 as shown or between the delay generator 26 and the pulse generator 24 (not shown). The modulating signal 82 alternately turns the timing signal on and off at a rate of a few kilohertz. This allows the output from the pulse read-out unit 80 to be modulated at the same rate. The modulation signal 82 is also passed to the wavelength detection unit for reference. The modulation allows for synchronous detection to be used in measuring the sensor signal. Synchronous detection permits the system to obtain higher sensitivity by rejecting noise such as the dark current from optical detectors and noise in electrical amplifiers.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An optical fiber serial Bragg grating sensor device, comprising:
  a) a light source adapted to produce optical pulses;
  b) an optical fiber network including an optical fiber optically coupled to said light source, the optical fiber including a Bragg sensor array having at least two spaced apart Bragg gratings; and
  c) an optical transmission element connected to a section of said optical fiber network adapted to receive optical pulses reflected from said at least two Bragg gratings, a wavelength detection means optically coupled to said optical transmission element, switch means connected to said optical transmission element for switching said optical transmission element between an attenuating state in which said optical transmission element attenuates light and a transmission state in which light is transmitted through said optical transmission element to said wavelength detection means, said switch means being activated at selectively adjustable times after production of said optical pulses.

2. The device according to claim 1 wherein said optical transmission element includes an optical modulator, and wherein said switch means includes a variable timer circuit controller connected to said optical modulator for switching said optical modulator between said transmission and attenuation states at said selectively adjustable times after production of said optical pulses.

3. The device according to claim 2 wherein said optical fiber is a single mode optical fiber, and wherein said at least two Bragg gratings is a plurality of Bragg gratings spaced an effective minimum distance apart.

4. The device according to claim 3 wherein said light source is adapted to produce optical pulses having a pulse width shorter than a time required for an optical pulse to travel approximately twice a distance between any two spatially closest Bragg gratings in said at least two Bragg gratings.

5. The device according to claim 4 wherein said light source is adapted to produce optical pulses with a period between said light pulses being greater than a time for an optical pulse to travel approximately twice a distance from a first Bragg sensor closest to said light source to a last Bragg grating farthest from said light source.

6. The device according to claim 5 wherein said variable timer circuit controller holds said optical modulator in said transmission state for a period of time longer than said pulse width.

7. The device according to claim 6 wherein said optical modulator is an electro-optic modulator, and wherein said variable timer circuit controller includes an electrical trigger pulse generator connected to said electro-optic modulator for applying trigger voltage pulses to said electro-optic modulator for switching to said electro-optic modulator to said transmission state, said electrical pulse generator including adjustment means for adjusting a length of time said trigger voltage pulses are applied to said electro-optic modulator for controlling a length of time said electro-optic modulator remains in said transmission state.

8. The device according to claim 7 wherein said variable timer circuit controller includes a variable electrical delay generator connected to said electrical trigger pulse generator for controlling when said electrical trigger pulse generator applies said electrical trigger pulses to said electro-optic modulator.

9. The device according to claim 8 wherein said variable electrical delay generator is adapted to be triggered by production of optical pulses to said such that said electro-optic modulator is switched between said transmission and attenuating states an adjustable time after production of said optical pulses.

10. The device according to claim 2 wherein said optical fiber network includes a first fiber section connected between said light source and an optical coupler, a second fiber section connected at one end thereof to said optical coupler having said at least two spaced apart Bragg gratings located therein, and a third fiber section connected at one end thereof to said optical coupler optically coupled to said optical transmission element.

11. The device according to claim 2 wherein said optical modulator is a semiconductor electro-absorption modulator.

12. The device according to claim 2 wherein said optical modulator is a Mach-Zehnder integrated optical modulator.

13. The device according to claim 1 wherein said light source is a mode locked laser.

14. The device according to claim 9 wherein said electro-optic modulator is a lithium niobate opto-electronic modulator.

15. The device according to claim 14 including a polarization control element in said optical fiber network between said Bragg gratings and said electro-optical modulator for controlling a state of polarization of said optical pulses reflected by said Bragg gratings.

16. A device for time domain demultiplexing serial optical fiber Bragg grating sensor networks, the network including a light source adapted to produce optical pulses connected to an optical fiber network with the optical fiber network including a sensor array having at plurality of spaced Bragg gratings, comprising:

an optical transmission element connected to a section of said optical fiber network adapted to receive optical pulses reflected from said at least two Bragg gratings, switch means connected to said optical transmission element for switching said optical transmission element between a transmission state in which said optical transmission element transmits light therethrough and an attenuating state in which said optical transmission element attenuates light, said switch means being activated at selectively adjustable times after production of said optical pulses; and wavelength detection means connected to said optical transmission element.

17. The device according to claim 16 wherein said optical transmission element includes an optical modulator, and wherein said switch means includes a variable timer circuit controller connected to said optical modulator for switching said optical modulator between said transmission and attenuation states as a function of elapsed time from production of said optical pulses.

18. The device according to claim 17 wherein said optical modulator is an electro-optic modulator, and wherein said variable timer circuit controller includes an electrical trigger pulse generator connected to said electro-optic modulator for applying trigger voltage pulses to said electro-optic modulator for switching to said electro-optic modulator to said transmission state, said electrical pulse generator including adjustment means for adjusting a length of time said trigger voltage pulses are applied to said electro-optic modulator for controlling a length of time said electro-optic modulator remains in said transmission state.

19. The device according to claim 18 wherein said variable timer circuit controller includes a variable electrical delay generator connected to said electrical trigger pulse generator for controlling when said electrical trigger pulse generator applies said electrical trigger pulses to said electro-optic modulator.

20. The device according to claim 19 wherein said variable electrical delay generator is adapted to be triggered by production of optical pulses to said such that said electro-optic modulator is switched between said transmission and attenuating states an adjustable time after production of said optical pulses.

21. The device according to claim 18 including a polarization control element in said optical fiber network between said Bragg gratings and said optical modulator for controlling a state of polarization of said optical pulses reflected by said Bragg gratings.

22. The device according to claim 20 including a low frequency signal generator connected to said wavelength detection means and to said variable timer circuit controller for modulating said electrical trigger pulses to applied to said electro-optic modulator.

23. The device according to claim 22 wherein said low frequency signal generator is connected between an output of said variable electrical delay generator and an input to said electrical trigger pulse generator.

24. The device according to claim 3 wherein said plurality of Bragg gratings have substantially equal center wavelengths.

25. The device according to claim 24 wherein a maximum number of Bragg gratings spaced along said optical fiber is given by a ratio of twice a time required for a light pulse to travel from a first Bragg sensor closest to said light source to a last Bragg grating farthest from said light source to a temporal duration of said transmission element being in said transmission state.

26. A method for time domain demultiplexing a serial fiber Bragg grating sensor network, the sensor network including an optical fiber having at least two spaced Bragg gratings and a light source for producing light pulses that propagate along said sensor network and are incident on said at least two Bragg gratings, comprising:

directing optical pulses reflected by said at least two Bragg gratings to an optical transmission element;

spectrally analyzing optical pulses reflected from a selected Bragg grating by switching said optical transmission element to a state of transmission at effective periods of time after preselected optical pulses are produced, said periods of time being equal to a transit time of said optical pulses from a light source to said selected Bragg grating and to said optical transmission element; and maintaining said optical transmission element in the state of transmission for an effective period of time to permit light pulses to be transmitted through said optical transmission element to a wavelength detection means and thereafter switching said optical transmission element to a state of attenuation to block optical pulses reflected from all other Bragg gratings.

27. The method according to claim 26 wherein said light source is adapted to produce optical pulses having a pulse width shorter than a time required for a light pulse to travel approximately twice a distance between any two spatially closest Bragg gratings in said at least two Bragg gratings.

28. The method according to claim 27 wherein said light source is adapted to produce optical pulses with a period between said optical pulses being greater than a time for an optical pulse to travel approximately twice a distance from a first Bragg sensor closest to said light source to a last Bragg grating farthest from said light source.

29. The method according to claim 28 wherein said optical modulator is switched into said transmission state for a period of time longer than said pulse width.

* * * * *